(12) United States Patent
Subrahmonia et al.

(10) Patent No.: US 8,175,906 B2
(45) Date of Patent: May 8, 2012

(54) INTEGRATING PERFORMANCE, SIZING, AND PROVISIONING TECHNIQUES WITH A BUSINESS PROCESS

(75) Inventors: Jayashree Subrahmonia, San Jose, CA (US); Rahul Jain, Campbell, CA (US); Noshir Cavas Wadia, Morgan Hill, CA (US); Peng Ye, Fremont, CA (US); Rekha Devi Garapati, Saratoga, CA (US); Cynthia Ferne Craine, Watsonville, CA (US)

(73) Assignee: International Business Machines Corporation, Armonk, NY (US)

( * ) Notice: Subject to any disclaimer, the term of this patent is extended or adjusted under 35 U.S.C. 154(b) by 1765 days.

(21) Appl. No.: 11/203,464

(22) Filed: Aug. 12, 2005

(65) Prior Publication Data

US 2007/0038493 A1    Feb. 15, 2007

(51) Int. Cl.
*G06F 17/30* (2006.01)
(52) U.S. Cl. ..................................... 705/7.25
(58) Field of Classification Search .................. 705/7.25
See application file for complete search history.

(56) References Cited

U.S. PATENT DOCUMENTS

| | | | |
|---|---|---|---|
| 6,442,557 B1 * | 8/2002 | Buteau et al. | 707/102 |
| 7,443,803 B2 * | 10/2008 | Su et al. | 370/252 |
| 2002/0049687 A1 * | 4/2002 | Helsper et al. | 706/45 |
| 2002/0069102 A1 | 6/2002 | Vellante et al. | |
| 2002/0156904 A1 | 10/2002 | Gullotta et al. | |
| 2002/0173997 A1 | 11/2002 | Menard et al. | |
| 2002/0198727 A1 * | 12/2002 | Ann et al. | 705/1 |
| 2003/0004848 A1 | 1/2003 | Hellerstein et al. | |
| 2003/0070157 A1 | 4/2003 | Adams et al. | |
| 2003/0125996 A1 | 7/2003 | Bush et al. | |
| 2003/0177160 A1 | 9/2003 | Chiu et al. | |
| 2003/0233354 A1 | 12/2003 | White et al. | |
| 2004/0003369 A1 | 1/2004 | Gonos | |
| 2004/0024627 A1 * | 2/2004 | Keener | 705/7 |
| 2004/0024673 A1 | 2/2004 | Huettl et al. | |
| 2004/0064548 A1 | 4/2004 | Adams et al. | |
| 2004/0162748 A1 * | 8/2004 | Vogel et al. | 705/8 |
| 2004/0162749 A1 * | 8/2004 | Vogel et al. | 705/8 |
| 2004/0162753 A1 * | 8/2004 | Vogel et al. | 705/10 |
| 2004/0165605 A1 | 8/2004 | Nassar | |
| 2004/0181476 A1 | 9/2004 | Smith et al. | |
| 2004/0181794 A1 | 9/2004 | Coleman et al. | |
| 2004/0186905 A1 | 9/2004 | Young et al. | |
| 2005/0086331 A1 | 4/2005 | Wadia et al. | |
| 2005/0213514 A1 * | 9/2005 | Su et al. | 370/254 |
| 2006/0083170 A1 * | 4/2006 | Silva et al. | 370/238 |
| 2006/0224399 A1 * | 10/2006 | Alkemper et al. | 705/1 |

OTHER PUBLICATIONS

IBM Corporation, "High Performance on Demand Solutions", [online], [Retrieved on Jun. 2, 2005], retrieved from the internet at <URL: http://www-128.ibm.com/developerworks/websphere/zones/hipods/>.
IBM High Performance on Demand Solutions Team, "IT Resource Optimization—Provisioning Case Study: WebSPhere Application Server Version 5", Version 1.0, Nov. 2004, pp. 1-18.

(Continued)

*Primary Examiner* — Romain Jeanty
(74) *Attorney, Agent, or Firm* — Janaki K. Davda; Konrad Raynes & Victor LLP

(57) ABSTRACT

Techniques are provided for automating allocation of resources based on business decisions. An impact of a business decision is quantified in terms of information technology (IT) metrics. The resources that may be needed to address the impact are estimated. The estimated resources are provisioned.

27 Claims, 10 Drawing Sheets

OTHER PUBLICATIONS

IBM High Performance on Demand Solutions Team, "It Resource Optimization—Orchestration Case Study: Integrating WebSphere and DB2 Orchestration with Enterprise Workload Manager", Version 1.0, Nov. 2004, pp. 1-21.

IBM High Performance on Demand Solutions Team, "IT Resource Optimization—Provisioning Case Study: pSeries and AIX LPARs", Version 1.0, Nov. 2004, pp. 1-30.

IBM High Performance on Demand Solutions Team, "Orchestration for on Demand Data Centers", Version I.0b, Jun. 2004, pp. 1-15.

IBM High Performance on Demand Solutions Team, "Provisioning Best Practices for on Demand Data Centers", Version 1.0, Jun. 2004, pp. 1-32.

IBM High Performance on Demand Solutions Team, "Provisioning for on Demand Data Centers", Version 1.0b, Jun. 2004, pp. 1-17.

IBM High Performance on Demand Solutions Team, "Virtualization and Automation: Best Practices for a WebSphere Application Server Environment", Version 2.0, Apr. 2005, pp. 1-26.

ITIL & IT Service Management Zone, "ITIL and IT Service Management", [online], [Retrieved on Aug. 12, 2005], retrieved from the Internet at <URL: http://www.itil.org.uk/>.

Office of Government Commerce (OGC), "IT Infrastructure Library (ITIL)", [online], 2005, [Retrieved on Aug. 12, 2005], retrieved from the Internet at <URL http://www.ogc.gov.uk/index.asp?id=2261>.

U.S. Appl. No. 10/686,988, filed Oct. 15, 2003, entitled "Autonomic Computing Algorithm for Identification of an Optimum Configuration for a Web Infrastructure", invented by N. C. Wadia, & P. Ye.

U.S. Appl. No. 10/729,362, filed Dec. 4, 2003, entitled "A System, Method, and Apparatus for Modeling and Analyzing a Plurality of Computing Workloads", invented by Y. Chen, R.L. Childress, C.H. Crawford, N. C. Wadia, & P. Ye.

* cited by examiner

400

[ Complete ] [ Save Changes ] [ Cancel ]

Business Analyst Console

Daily Sales Report: November 15, 2004

Here are the sale details:

```
Item              :Designer Jean
Quantity Sold     :1000
Unit Price        :$59
Revenue Generated :$59000
```

Recommend starting a new promotional sale.

Activity Output Message

Do you approve this recommendation?

⊙ Yes   ○ No

Click the Complete button at the top of the page to submit your decision.

FIG. 4

INTEGRATING PERFORMANCE, SIZING, AND PROVISIONING TECHNIQUES WITH A BUSINESS PROCESS

BACKGROUND

1. Field

Embodiments of the invention relate to a technique for integrating performance, sizing, and provisioning techniques with a business process.

2. Description of the Related Art

Momentum is growing for enterprises (i.e., organizations that use computers) to move to an on demand operating environment (i.e., become on demand businesses). An on demand business may be described as being flexible and reacting quickly to changing business conditions. Many enterprises see the on demand operating environment as the answer to the challenges of low resource utilization, high system management costs, long times to deploy new business functions, and nonintegrated business processes.

A major focus for an on demand business is achieving the flexibility needed to react quickly and adapt to changing conditions. Businesses that achieve this flexibility expect to have an edge over competitors who do not have such flexibility.

A large business typically has multiple departments. In any such large business, no matter how efficient any one department is, the way that the department communicates decisions to other departments is often inefficient, sometimes to the detriment of business results. Mature businesses are realizing they can no longer remain competitive if they tolerate such inefficiencies.

For example, a large business may have one department (e.g., a business department) that makes the business decisions and another department (e.g., an IT department) that is tasked with running a data center. Supporting the impact of business decisions on data center resources in a timely manner requires a consistent and efficient interaction between the two departments. Communication between these two departments is often ad hoc and usually involves a business analyst in the business department trying to reach the data center staff in the data center department via telephones. Often, the response is not received in a timely manner, and the business analyst is unable to execute the change that might have given the business a competitive edge.

One way to achieve the efficiency in communication is via automation. However, there are factors that prevent prompt and efficient implementation of business decisions in conventional systems, including: 1) a lack of information on the impact of the business decision on Information Technology (IT) resources and 2) a long turnaround time for IT operations to prepare and provision resources.

Another goal that successful enterprises aspire towards is being flexible enough to adapt to changing business conditions. Currently, flexibility may be at the IT level, at the business level, or both. Certain technology solutions (e.g., the High Performance On Demand (HiPODS) WebSphere® and DB2® Orchestration solution (also referred to as a WADO solution) available from International Business Machines Corporation) enable users to run multiple applications on a shared set of servers, and still meet their Service Level Agreements (SLAs), without human intervention. Briefly, in the WADO solution, applications are first prioritized. Under peak load conditions, servers in a spare pool are autonomically provisioned to process increased real-time traffic. Under normal load conditions, the servers in the spare pool do not sit idle, but process the workloads of the other lower priority applications that reside on the same set of servers. Adopting such technology solutions may result in efficient use of hardware resources. These technology solutions provide the foundation for an on demand operating environment, and flexibility is achieved at the IT level.

Current solutions do not provide flexibility at the business level. Flexibility at the business level may be described as the ability to make a business decision and respond to the IT ramifications of the business decision in a timely manner. For example, if, the owner of an online retail store decides to start a new promotion, the owner needs to ensure that there are enough servers in the data center to handle the increased traffic on the web site as a result of the promotion. This check would avoid overloading of the servers. An inadequate number of servers may increase response times and make the online store unresponsive, ultimately leading to loss of business. Current solutions available today do not address the flexibility needed for such a scenario. The appropriate infrastructure would allow owners to make their business decisions and let the IT department ensure sufficient capacity is available. If the IT department is not able to meet the new requirements, the infrastructure should allow the business owners to be promptly notified to take appropriate action.

Another example illustrates this idea of achieving flexibility at the business level. A business analyst of a toy retail store realizes by monitoring key sales performance indicators that sales for hardware game consoles are down. After further analysis, the business analyst also finds that the games, which have relatively higher profitable margins, are not selling well either. As an experienced person in the retail toy industry, the business analyst knows that by selling the game consoles at a discount, more customers will also end up buying games to play on the game consoles, thereby driving higher profits for the toy store. Now, putting the hardware game consoles on sale has two implications: 1) the sale may drive large volume of customers to the online web site and 2) stores need to be adequately stocked with enough inventory to satisfy the expected increased demand. Before the business analyst may decide to start a new promotion, the business analyst needs to ensure that both the implications are covered. This may mean getting go-ahead acknowledgements promptly from the inventory manager and the IT manager. With current solutions, this process is performed manually by the business analyst talking to the inventory manager and the IT manager.

An on demand operating environment implies flexibility in multiple aspects of a business. Being able to get the current status of inventory is very important for a retail business, more and more of which are using technologies, such as radio frequency identifications (RFIDs). In the toy store example, the business analyst was alerted that a particular store was running low in its inventory of hardware game consoles. Because the toy store business was using technologies, such as RFID technology, to monitor shipments, the business analyst could quickly determine that a shipment was due to leave the warehouse for another store that was not quite as low on inventory. This gave the business analyst the opportunity to divert the shipment of game consoles from the warehouse to the store that was low in its inventory. This was possible because the toy store company integrated and automated different aspects of their business departments. However, in current solutions, this is done manually by the business analyst.

Flexibility at the business level also includes the ability to handle change requests frequently, not just seasonally. Most businesses have adequate processes to handle seasonal changes. More and more, businesses need to react to daily requests. An online store that has the freedom to make daily decisions about what items to put on sale clearly has a competitive edge over those that can react only on a monthly or seasonal basis.

Today many businesses address the challenges of fluctuating IT demands by over provisioning and setting up dedicated silos. A silo may be described as a set of hardware assigned to one application. Silos may result in disparate grouping of hardware resources with very little overall utilization.

Thus, there is a need in the art for integrating performance, sizing, and provisioning techniques with a business process.

SUMMARY

Provided are a method, article of manufacture, and system for automating allocation of resources based on business decisions. An impact of a business decision is quantified in terms of information technology (IT) metrics. The resources that may be needed to address the impact are estimated. The resources that have been estimated are provisioned.

BRIEF DESCRIPTION OF THE DRAWINGS

Referring now to the drawings in which like reference numbers represent corresponding parts throughout:

FIG. 4 illustrates a business analyst console in accordance with certain embodiments.

DETAILED DESCRIPTION

In the following description, reference is made to the accompanying drawings which form a part hereof and which illustrate several embodiments. It is understood that other embodiments may be utilized and structural and operational changes may be made without departing from the scope of embodiments of the invention.

Figure 1:
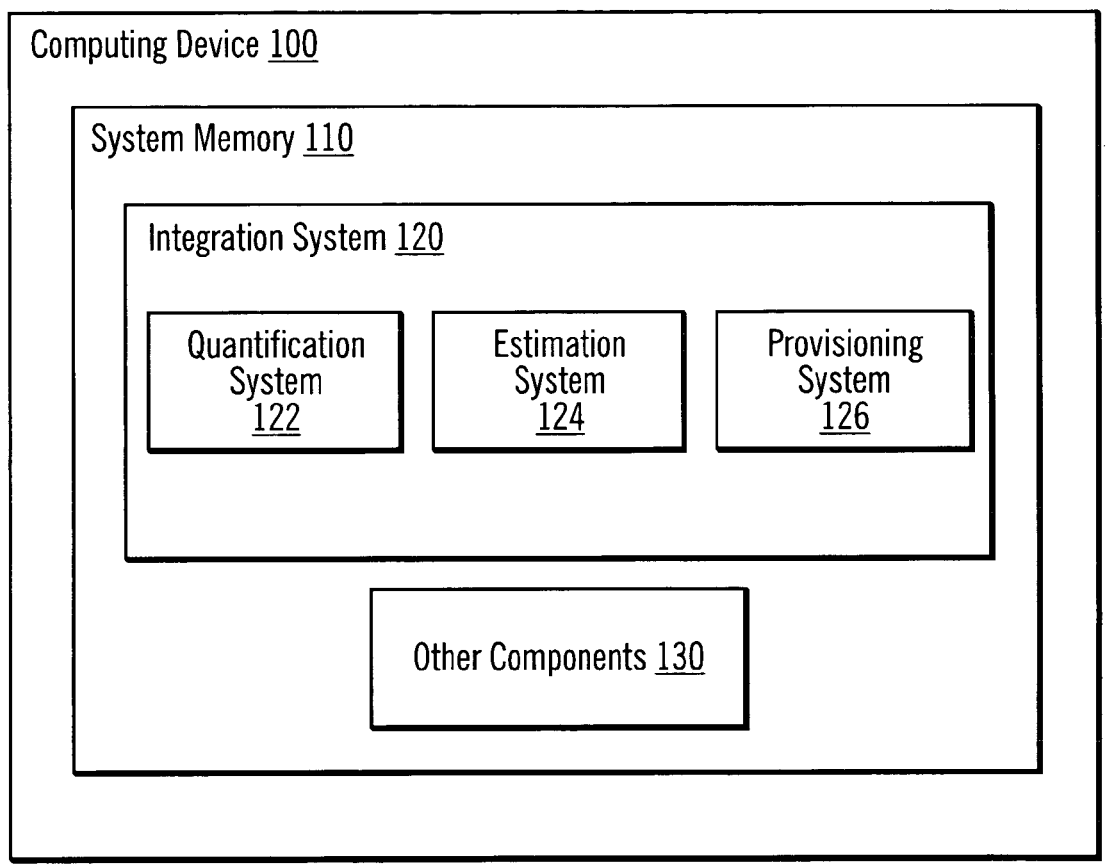
FIG. 1 illustrates details of a computer architecture in which certain embodiments may be implemented.
Figure 7:
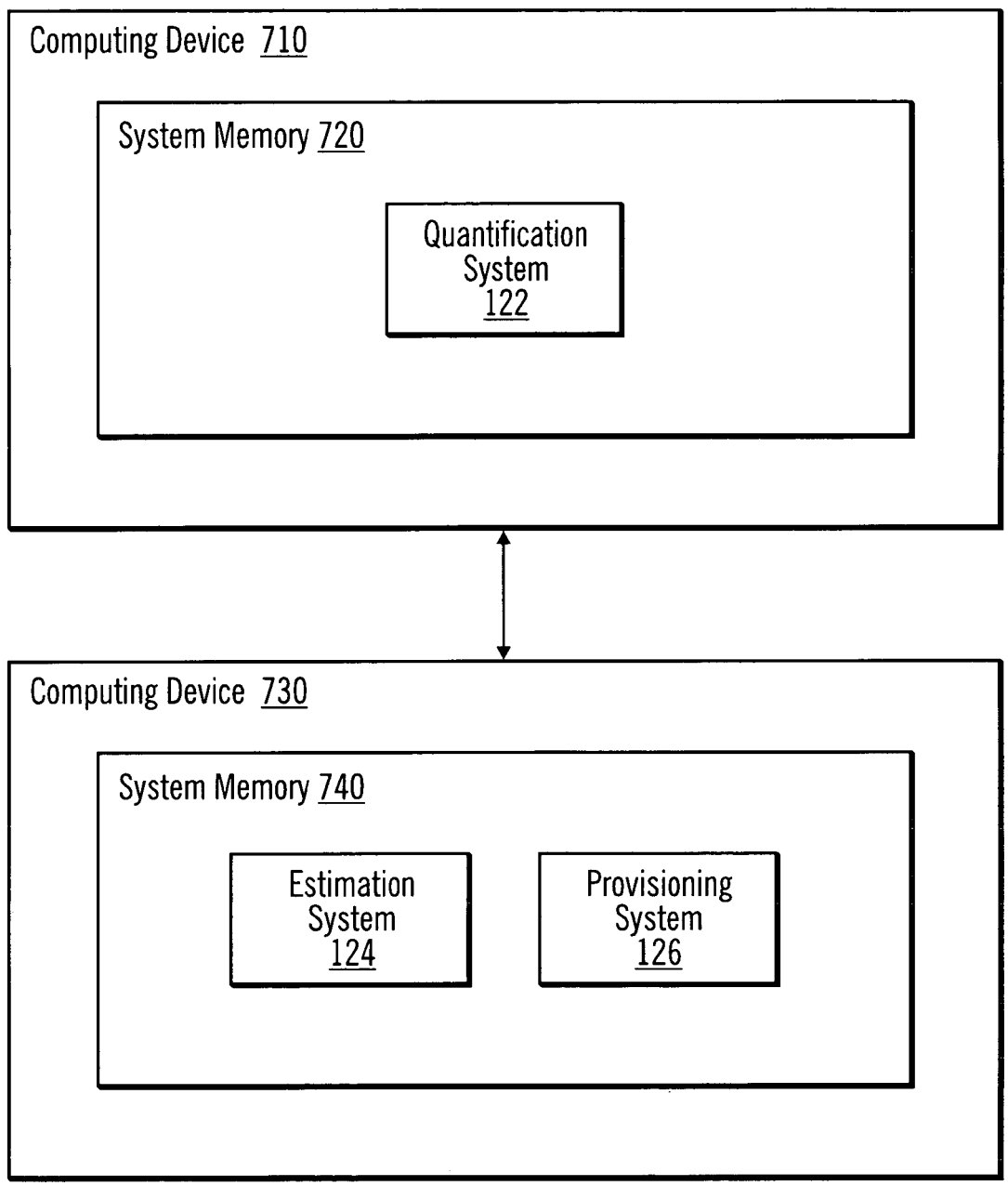
FIG. 7 illustrates details of an alternative computer architecture in which certain embodiments may be implemented.

FIG. 1 illustrates details of a computer architecture in accordance with certain embodiments. A computing device 100 includes system memory 110, which may be implemented in volatile and/or non-volatile devices. An integration system 120 is stored in the system memory 110 for execution by a processor (e.g., a Central Processing Unit (CPU)) (not shown). The integration system 120 includes a quantification system 122, an estimation system 124, and a provisioning system 126. System memory 110 may also store other components 130. Although the quantification system 122, an estimation system 124, and a provisioning system 126 are illustrated as part of an integration system 120, in various embodiments, these systems 122, 124, 126 may be combined to form various combinations and may reside on the same or different computing devices. For example, FIG. 7 illustrates an alternative embodiment in which system 122 resides on a different computing device from systems 124, 126.

In alternative embodiments, the integration system 120 is a computer program that may be implemented as hardware, software, or a combination of hardware and software.

The computing device 100 may comprise any computing device known in the art, such as a server, mainframe, workstation, personal computer, hand held computer, laptop telephony device, network appliance, etc.

Examples will be provided to enhance understanding of embodiments of the invention, but the embodiments are not to be limited to such examples.

Embodiments automate the ramifications of business decisions on preparation of Information Technology (IT) infrastructure resources to handle the ramifications, which results in a business becoming more flexible and responsive to changing conditions. For example, if a business increases sales targets, embodiments enable the business to ensure that the IT infrastructure is ready to process the additional load that will be generated. Embodiments provide a technique for estimating and orchestrating IT resources based on business decisions.

As an example, a business includes a business analysts group and an operations group. The business analysts group includes individuals who make business decisions about, for example, promotional sales of items. The operations group includes individuals who are in charge of the IT infrastructure and day to day operations. A business analyst at a retail department store decides to start a promotion of an item that is available via a web site. Extending the sale of the item may result in additional traffic to web site. Hence, this business decision has to be communicated to an operations department, so that necessary resources are provisioned to handle the increased traffic that the web site may see.

Embodiments automate the business process and, thereby, improve the efficiency of communication between departments. Automation provides a discipline and a structure and removes the ad hoc nature of many communications (e.g., between departments of a company). Automation of data center operations typically provides a positive return on investments.

Figure 2:
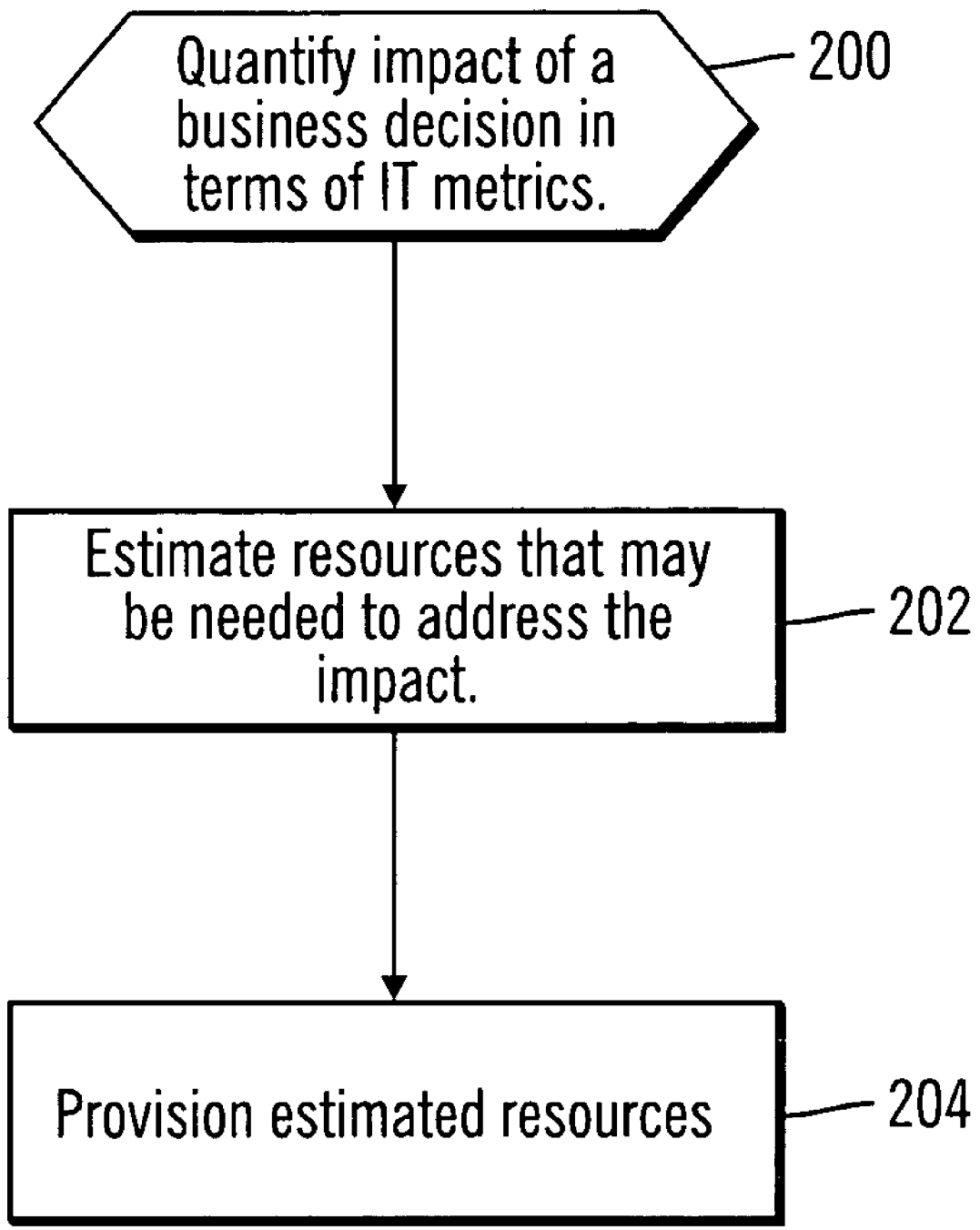
FIG. 2 illustrates logic performed by the integration system in accordance with certain embodiments.

Embodiments also enable transformations to automate the impact of business decisions on the IT infrastructure. The transformations are to quantify the impact of business decisions on IT metrics and to learn to estimate the resources required to handle increased IT traffic. FIG. 2 illustrates logic performed by the integration system 120 in accordance with certain embodiments. Control begins at block 200 with the quantification system 122 of the integration system 120 quantifying the impact of a business decision in terms of IT metrics. For example, the quantification system 122 provides quantification of the impact of business decisions on network traffic in the IT infrastructure.

In other words, the quantification system maps business decisions to IT metrics using analytics and/or forecasting models that take into account historical data. IT metrics may be described as parameters for quantitative assessment of IT resources. For example, IT metrics may help gauge the utilization and efficiency of IT resources. IT metrics define what is to be measured, such as transactions per second, number of concurrent users, CPU utilization, incoming traffic arrival rate, response time of the application that is being accessed, etc. That is, the quantification system 122 performs quantification using domain specific business intelligence analysis (e.g., mining data in datastores to extract workload patterns). Workload patterns may be described as trends exhibited by the accumulated historical data (e.g., collected IT metrics). An example of a workload pattern is that expected CPU utilization may be 55%, and this trend was identified using the analytics and/or forecasting models that utilized the historical data.

For example, if a business analyst for an online store decides to start a promotion on certain items, the effect of that decision may be quantified in terms of the additional traffic the online store will get, say 200 additional Transactions Per Seconds (TPS). An example in the insurance industry may be that a business analyst decides to extend an open enrollment process to a new geographic region. The effect of this decision may be quantified in terms of how many additional concurrent users (ultimately additional transactions per second of traffic) the IT infrastructure will have to support.

After quantification, in block 202, the estimation system 124 of the integration system 120 estimates resources that may be needed to address the impact. For example, the estimation system 124 estimates IT resources required to meet any increased traffic that the IT infrastructure will have to support. The estimation system 124 maps increased workload to additional IT resources. In certain embodiments, the estimation system 122 may use configuration estimation tools, mathematical modeling tools, and/or forecasting models to perform the estimation of the IT resources using historical data. Configuration estimation tools may also be referred to as capacity planning tools. As a simple example, historical data may indicate that two servers were required to handle a traffic load of 300 transactions per second. Then, based on this historical data, it may be forecast that to meet a traffic load of 600 transactions per second, four servers are needed. In other examples, a more complex analysis of the historical data is performed to estimate the IT resources that are needed for a particular workload. Further details of one such estimation of IT resources may be found in U.S. Patent Application No. 2005/0086331, filed on Apr. 21, 2005, entitled "Autonomic Computing Algorithm for Identification of an Optimum Configuration for a Web Infrastructure", by Noshir C. Wadia, et al., which is incorporated by reference herein in its entirety.

In an on demand environment, IT resources for applications are provisioned to handle peak traffic volumes. Business decisions may affect peak threshold values. The IT infrastructure needs to accommodate new business directions. As an example, an additional peak traffic of 200 TPS may require, for example, two additional application servers. This mapping may be domain and application specific and may use configuration estimation tools.

With these quantification and estimation, the changes to the IT infrastructure needed to prepare for the impact of the new business decision are known. Next, provisioning actions are executed. Provisioning actions are initiated automatically as long as they fall within certain operational guidelines. For example, a business rule may be instituted that permits one application server to be provisioned automatically, but that asks for explicit approval from an operations manager, when action on more than one server is required.

In block 204, the provisioning system 126 of the integration system 120 provisions the estimated resources. Provisioning the estimated resources may be described as allocating the estimated resources as follows: 1) if the resources are available, allocating the estimated resources immediately, 2) if a portion of the estimated resources are available, allocating those resources and optionally allocating additional resources when the additional resources become available, 3) if some of the estimated resources are available, waiting until all of the resources become available to allocate the resources, and 4) if none of the estimated resources are immediately available, allocating the resources when the resources become available. In certain embodiments, if resources are not immediately available, the resources may become available when they are released by, for example, other applications, or the resources may become available because new resources have been purchased and added. In certain embodiments, the provisioning of the estimated resources is automatically performed, while in other embodiments, the provisioning may be manually performed by, for example, a system administrator. In certain embodiments, if the estimate of the resources is inadequate (e.g., does not meet a system administrator's expectations and/or is does not meet the requirements of an increased workload (e.g., three servers are estimated when four servers are needed)), then, user intervention may be required to address the inadequacy (e.g., to add the fourth server). In certain embodiments, in which the provisioning is automated, user interaction may be used to correct certain error conditions (e.g., the allocated resources are inadequate or cause other problems). As an example, provisioning may involve installing a software stack, including an operating system and its configuration, as well as, end user applications. The provisioning system 126 provisions additional resources automatically. In certain embodiments, the provisioning system 126 invokes provisioning software solutions (e.g., IBM® Tivoli® Intelligent Orchestrator and Tivioli® Provisioning Manager available from International Business Machines Corporation).

The ability to automatically initiate provisioning works when the individual provisioning tasks are automated.

An on demand operating environment allows and enables a business to implement new decisions in a timely manner. In embodiments, the on demand operating environment is built on the concepts of virtualization, provisioning, and orchestration of resources, tied together using principles espoused under services oriented architectures. Virtualization may be described as a concept that provides a logical view of disparate physical resources. This concept then allows the differing physical resources to be managed in a uniform manner, leading to higher efficiency and automation. For example, tasks that were previously manual may be executed 24 hours a day with little supervision. Provisioning tasks, such as setting up servers, which could take up to two weeks, may be completed with fewer errors in less time (e.g., in less than a couple of hours). Virtualization and provisioning enable orchestration. Orchestration in an on demand operating environment is the ability to repurpose and align hardware and software resources to meet fluctuating traffic conditions, with little or no manual intervention, while continuing to meet Service Level Agreements for the application.

In one example, a retail clothing store has an online business. Business analysts in this retailer's online business department make daily decisions about which items go on promotional sale. These business level decisions have an impact on the volume of traffic to the web site of the online business. Hence, these 'sale' decisions are communicated to the operations staff, so they can ensure that the IT infrastructure supporting the shopping application has sufficient resources to handle the increased traffic. With embodiments, the retailer automates the communication and provisioning processes.

Figure 3A:
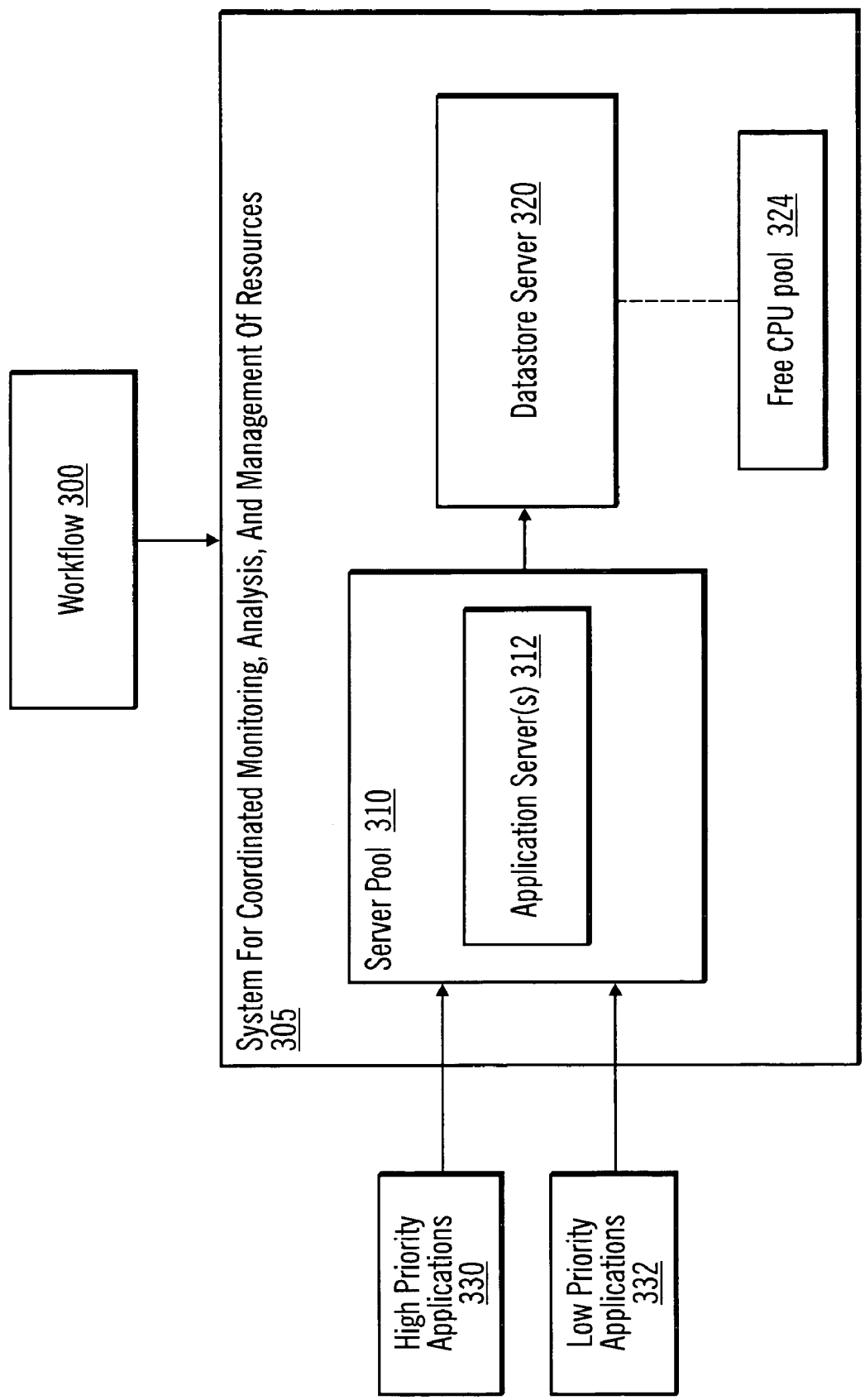
FIG. 3A illustrates an overall architecture that includes a workflow in accordance with certain embodiments.

FIG. 3A illustrates an overall architecture that includes a workflow 300 in accordance with certain embodiments. The first step in automation is modeling a business process as a workflow 300 (e.g., using a tool, such as the WebSphere® Business Integration Modeler available from International Business Machines Corporation). The workflow 300 models and simulates the business process and integrates people, processes, and applications in a common infrastructure. The workflow 300 may then be expressed using a workflow description language, such as Business Process Execution Language (BPEL) constructs, and, eventually, the resulting application may be deployed and released for production in an on-demand environment. A system for coordinated monitoring, analysis, and management of resources 305 coordinates resources between different tiers (i.e., the server pool 310 and the datastore server 320 tiers). In certain embodiments (e.g., WADO solutions), the orchestration of resources at the server pool tier are coordinated with orchestration of resources at the datastore server tier. A server pool 310 may be described as a grouping of servers (containing servers such as WebSphere® Business Integration Server Foundation servers available from International Business Machines Corporation) that may be provisioned to meet, for example, Service Level Agreements (SLAs) for high priority applications 330 and low priority applications 332. Also, the datastore server 320 may provision CPU resources from a free CPU pool 324 as required.

Figure 3B:
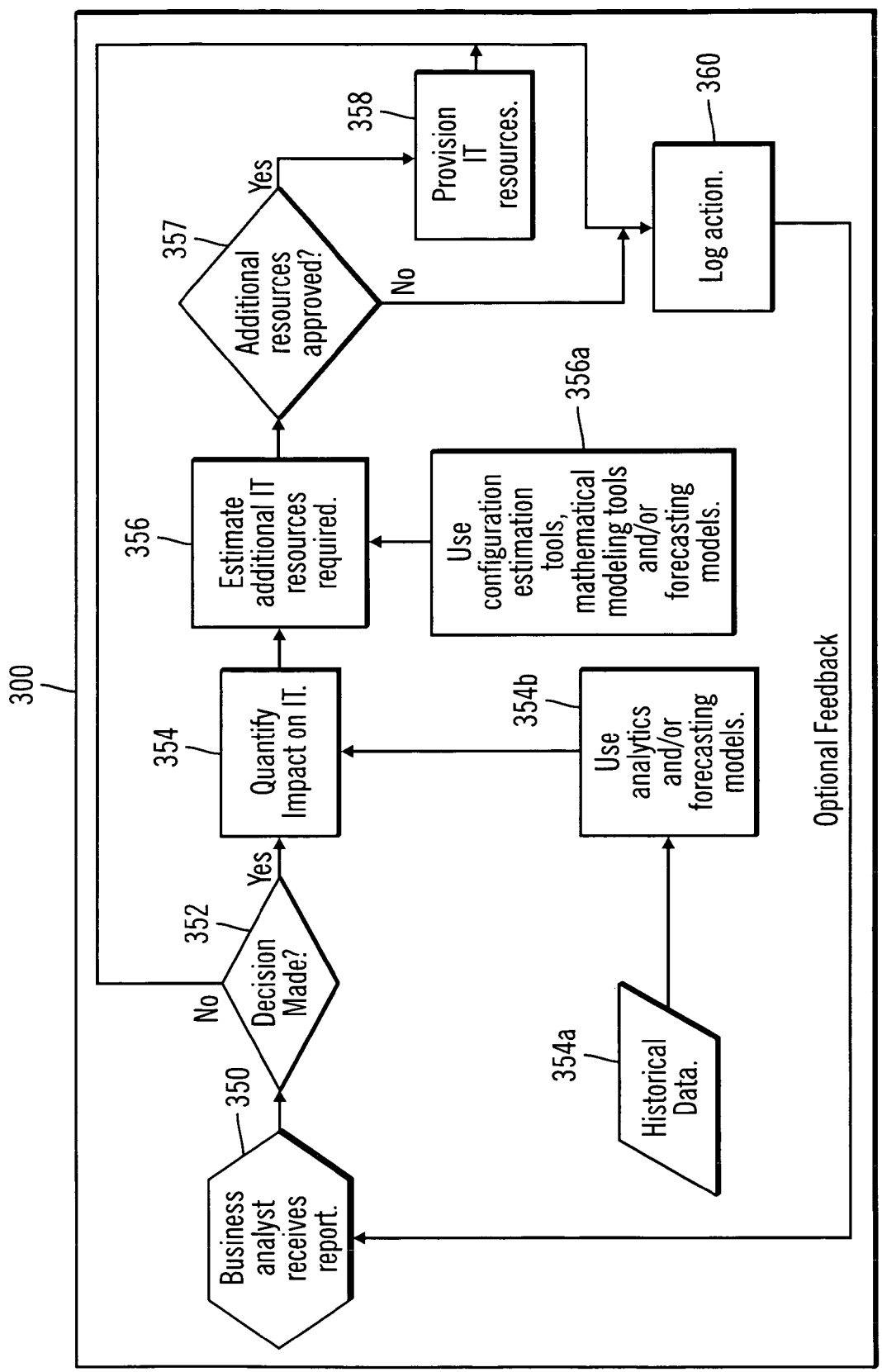
FIG. 3B illustrates a workflow in accordance with certain embodiments.

FIG. 3B illustrates a workflow in accordance with certain embodiments. In particular, the decision making process is modeled as a workflow 300.

In the workflow 300, a business analyst receives a report reflecting business conditions (block 350). In the retail example, the business analyst decides to extend the sale of an item. This decision results in an increased load on the business IT infrastructure in terms of additional traffic for the online store. In block 352, it is determined whether a decision has been made by the business analyst. If a decision has been made, processing continues to block 354, otherwise, processing continues to block 360. In block 354, the impact of the business decision on IT is quantified in terms of IT metrics (e.g., transactions per second). In particular, the additional traffic is quantified by the customer's business intelligence rules with the quantification system 122. By using historical data (block 354a) and accompanying analytics and/or forecasting models 354b, the result is quantified in block 354. In particular, business intelligence tools (e.g., IBM® Retail Business Intelligence Solutions Suite solution available from International Business Machines Corporation) may be used to mine data in datastores to extract the workload patterns.

After quantification, in block 356, the estimation system 124 determines whether any additional IT resources are required and determines what type and how many additional IT resources may be required. The estimation system 124 may use configuration estimation tools, mathematical modeling tools, and/or forecasting models to estimate the resources that may be needed to meet the estimated increase in traffic. In this example, an estimate is communicated to the provisioning system 126, which may be managed by the IT department.

In block 357, it is determined whether the additional resources have been approved for provisioning. If so, processing continues to block 358, otherwise, processing continues to block 360.

In block 358, the provisioning system 126 provisions the estimated resources. These additional resources may be provisioned automatically by the provisioning system 126 (e.g., using Tivoli® Intelligent Orchestrator). Business rules may dictate whether explicit approval from the operations manager is required before the servers are provisioned. When provisioned, embodiments, such as the High Performance On Demand (HiPODS) WebSphere and DB2® Orchestration solution, assume control of optimally utilizing the resources based on real time traffic. From block 358, processing continues to block 360. In block 360, actions are logged taken for auditing purposes. Also, an optional feedback loop may be included in the workflow so that logged actions are reported to the business analyst.

Thus, in analyzing IT impact, a business decision is mapped to a workload pattern or to changes in a workload pattern. The business decision is captured with a workflow, and, for example, forecasting models may be used to identify the workload pattern or changes to the workload pattern.

FIG. 4 illustrates a business analyst console 400 in accordance with certain embodiments. Periodically, a business analyst consults daily sales reports to determine which items should remain on sale. In FIG. 4, the console 400 illustrates a daily report recommending that a new promotional sale be started for designer jeans. A business analyst may indicate approval for starting a new promotional sale by selecting the "Complete" button.

Figure 5:
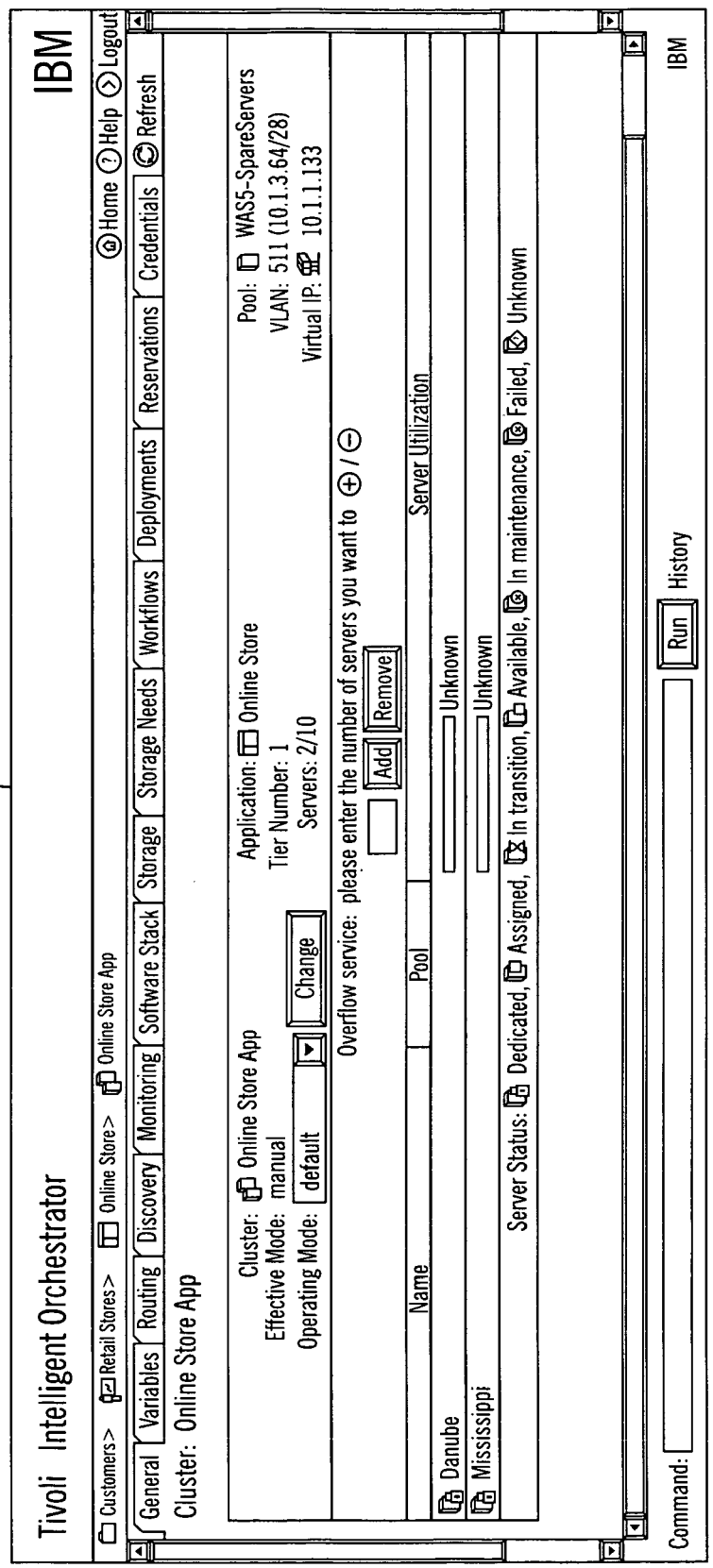
FIG. 5 illustrates a screen showing a current state of servers in accordance with certain embodiments.

FIG. 5 illustrates a screen 500 showing a current state of servers in accordance with certain embodiments. In FIG. 5, the screen 500 shows two servers (i.e., Danube and Mississippi) available to process the traffic coming to the online shopping web site before the start of the new promotion.

Figure 6:
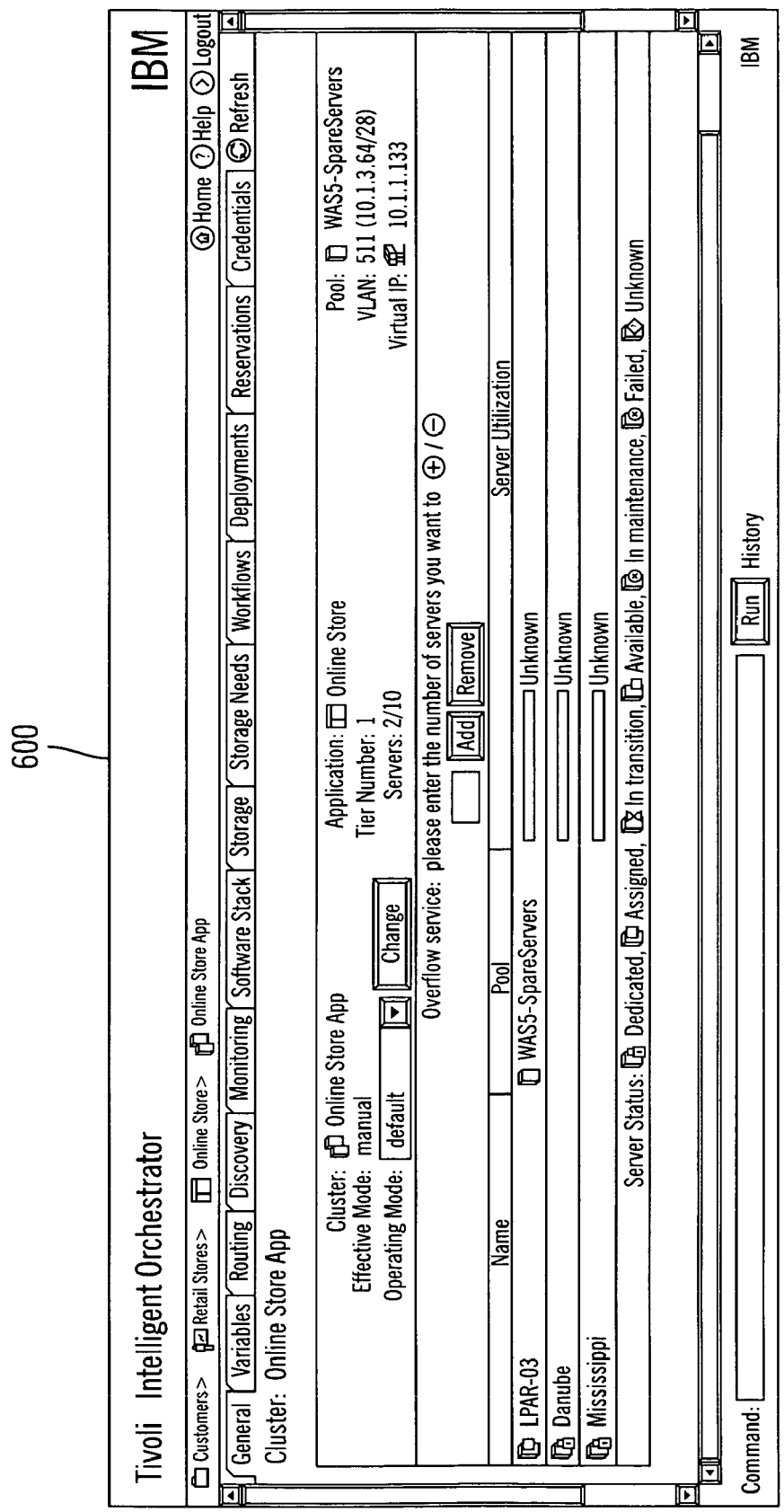
FIG. 6 illustrates that a screen that shows that a third server has been provisioned in accordance with certain embodiments.

With reference to FIG. 5, when the business analyst clicks the "Complete" button indicating approval for the sale, the automated workflow application (based on the workflow 300 of FIG. 3B) invokes the provisioning system 126 to provision a third server in the same pool. FIG. 6 illustrates a screen 600 that shows that a third server (i.e., the LPAR-03 server) has been provisioned in accordance with certain embodiments. In particular, screen 600 shows three servers available to process the traffic coming to the online shopping web site after the start of a new promotional sale.

Thus, the workflow of FIG. 3 used the components of the integration system 120 to provision an additional server with little human intervention (i.e., the business analyst input an indication to start the sale). The scenario illustrated with FIGS. 3-6 shows how a retailer is able to quickly react to changing business conditions. By automating the business decision making process and tying those decisions to the provisioning of IT resources, the retailer is moving towards having an on demand business.

FIG. 7 illustrates details of an alternative computer architecture in which certain embodiments may, be implemented. In FIG. 7 computing device 710 is connected to computing device 730 (e.g., via a network). Computing device 710 includes system memory 720, which may be implemented in volatile and/or non-volatile devices. A quantification system 122 is stored in the system memory 720 for execution by a processor (e.g., a Central Processing Unit (CPU)) (not shown). Computing device 730 includes system memory 740, which may be implemented in volatile and/or non-volatile devices. An estimation system 124 and a provisioning system 126 are stored in the system memory 740 for execution by a processor (e.g., a Central Processing Unit (CPU)) (not shown).

Figure 8:
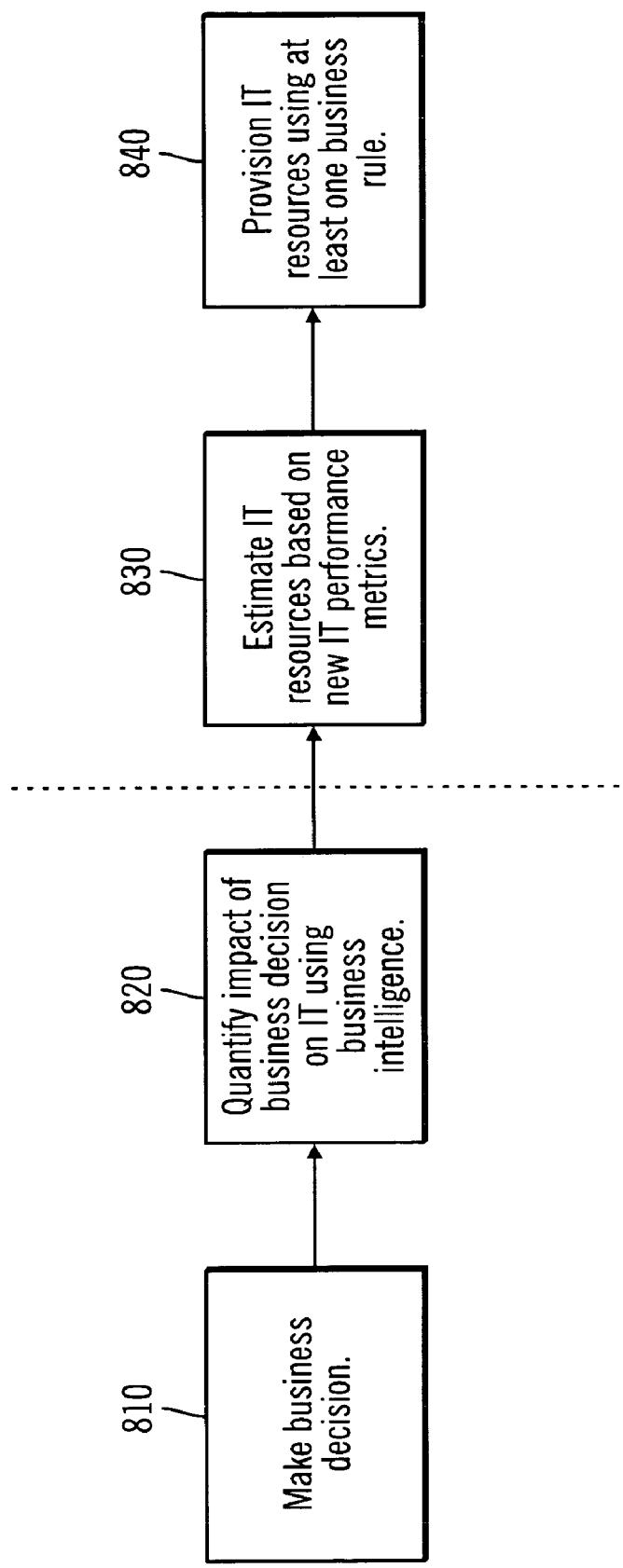
FIG. 8 illustrates a process for automating business decisions and responding to their effect on the IT infrastructure in accordance with certain embodiments.

FIG. 8 illustrates a process for automating business decisions and responding to their effect on the IT infrastructure in accordance with certain embodiments. Initially a business decision is made (block 810). In block 820, the quantification system 122 quantifies the impact of the business decision on IT using business intelligence. For example, the quantification system 122 may determine that putting blue jeans on sale will result in 100 transactions per second of increased traffic to a web site. In block 830, the estimation system 124 maps application performance goals into the hardware required to meet them. For example, the estimation system 124 may determine that an additional 100 transactions per second of increased traffic requires one additional application server. In block 840, the provisioning system 126 initiates the provisioning of IT resources identified by the estimation system 124 using at least one business rule. This may include automatically adding the application server to a current group of servers managing the traffic to the web site.

Embodiments capture business intent with a workflow and map the business intent to an IT workload pattern using quantification (which uses forecasting models).

Thus embodiments determine IT provisioning details from workload patterns and automate ramification of business decisions to preparation of IT infrastructure resources. Embodiments quantify a business decision impact on network traffic, estimate and orchestrate IT resources based on business decisions, provisioning IT resources to handle increased web traffic. Thus embodiments automate provisioning of additional resources.

Embodiments provide IT resource optimization. Automating this process is especially useful for an on demand business. Embodiments enable a business to achieve more flexibility when the business automates the communication between the processes of making business decisions and maintaining the IT infrastructure.

Embodiments eliminate silos and provide an environment in which applications share infrastructure resources. Resources are provisioned for peak capacities as defined by current business directions. As the business makes new decisions, the peak thresholds for the applications may change, and the IT processes are capable of handling many change requests efficiently. Change requests may be described as requests to change the environment.

The following are trademarks or registered trademarks of International Business Machines Corporation in the United States, other countries, or both: DB2, IBM, Tivoli, and WebSphere.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The term logic may include, by way of example, software or hardware and/or combinations of software and hardware.

The logic of FIGS. 2 and 3B describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2 and 3B may be implemented in software, hardware, programmable and non-programmable gate array logic or in some combination of hardware, software, or gate array logic.

Figure 9:
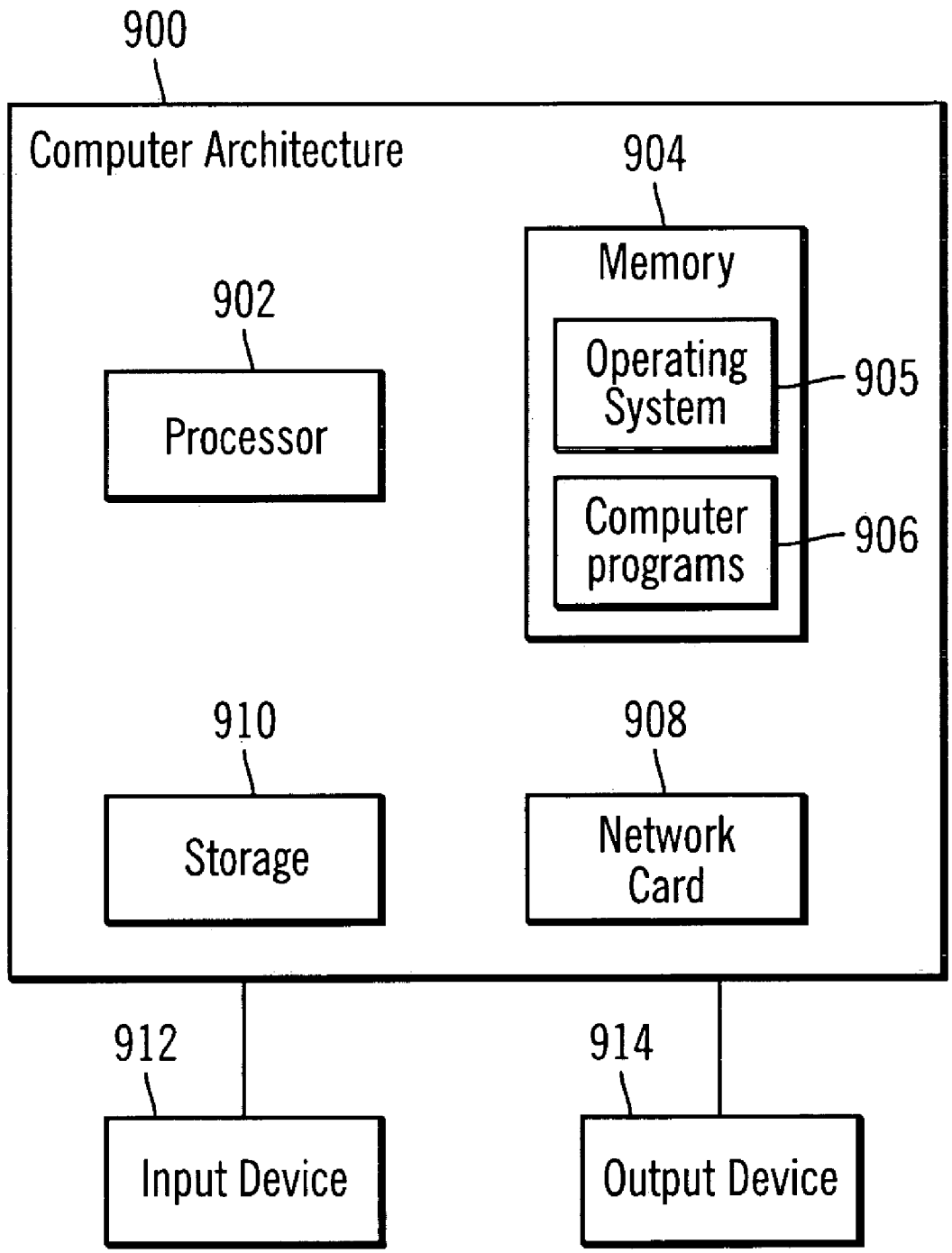
FIG. 9 illustrates an architecture of a computer system that may be used in accordance with certain embodiments.

FIG. 9 illustrates an architecture 900 of a computer system that may be used in accordance with certain embodiments. Computing device 100, 710, and/or 730 may implement architecture 900. The computer architecture 900 may implement a processor 902 (e.g., a microprocessor), a memory 904 (e.g., a volatile memory device), and storage 910 (e.g., a non-volatile storage area, such as magnetic disk drives, optical disk drives, a tape drive, etc.). An operating system 905 may execute in memory 904. The storage 910 may comprise an internal storage device or an attached or network accessible storage. Computer programs 906 in storage 910 may be loaded into the memory 904 and executed by the processor 902 in a manner known in the art. The architecture further includes a network card 908 to enable communication with a network. An input device 912 is used to provide user input to the processor 902, and may include a keyboard, mouse, pen-stylus, microphone, touch sensitive display screen, or any other activation or input mechanism known in the art. An output device 914 is capable of rendering information from the processor 902, or other component, such as a display monitor, printer, storage, etc. The computer architecture 900 of the computer systems may include fewer components than illustrated, additional components not illustrated herein, or some combination of the components illustrated and additional components.

The computer architecture 900 may comprise any computing device known in the art, such as a mainframe, server, personal computer, workstation, laptop, handheld computer, telephony device, network appliance, virtualization device, storage controller, etc. Any processor 902 and operating system 905 known in the art may be used.

The foregoing description of embodiments has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A method for automating allocation of resources, comprising:
in response to receiving an indication that network traffic to an online site will change,
quantifying, using a computer including a processor, an impact of the changed network traffic using historical data;
in response to the quantifying, estimating, using the computer including the processor, the resources that are needed to address the impact using the historical data;
in response to the estimating, using the computer including the processor, provisioning without manual intervention the resources that have been estimated to handle the changed network traffic to the online site when the resources fall within predetermined guidelines; and
processing, using the computer including the processor, the changed network traffic to the online site using the provisioned resources.

2. The method of claim 1, wherein provisioning the resources is based on at least one business rule.

3. The method of claim 1, further comprising:
determining whether approval to provision the estimated resources is required; and
in response to determining that approval is required, requesting approval.

4. The method of claim 3, further comprising:
provisioning the resources in response to authorization to provision the resources.

5. The method of claim 1, wherein provisioning further comprises:
if the estimated resources are immediately available, allocating the estimated resources immediately;
if a portion of the estimated resources are immediately available, allocating the portion of the estimated resources immediately and allocating additional resources when the additional resources become available; and
if none of the estimated resources are immediately available, allocating the estimated resources when the resources become available.

6. The method of claim 1, wherein provisioning further comprises:
if some of the estimated resources are available, waiting until all of the estimated resources become available to allocate the estimated resources.

7. The method of claim 1, further comprising:
integrating the quantifying, the estimating, and the provisioning with a workflow expressed in a workflow description language that models a business process.

8. The method of claim 1, wherein quantifying the impact further comprises:
using at least one of analytics and forecasting models.

9. The method of claim 1, wherein estimating the resources further comprises:
using at least one of configuration estimation tools, mathematical modeling tools, and forecasting models to perform the estimation.

10. An article of manufacture for automating allocation of resources, wherein the article of manufacture comprises a computer readable medium storing a program including instructions, which, when executed by a processor of a computer causes the computer to perform operations, and wherein the operations are operable to:
in response to receiving an indication that network traffic to an online site will change,
quantify an impact of the changed network traffic using historical data;
in response to the quantifying, estimate the resources that are needed to address the impact using the historical data;
in response to the estimating, provision without manual intervention the resources that have been estimated to handle the changed network traffic to the online site when the resources fall within predetermined guidelines; and
processing the changed network traffic to the online site using the provisioned resources.

11. The article of manufacture of claim 10, wherein provisioning the resources is based on at least one business rule.

12. The article of manufacture of claim 10, wherein the operations are operable to:
determine whether approval to provision the estimated resources is required; and
in response to determining that approval is required, request approval.

13. The article of manufacture of claim 12, wherein the operations are operable to:
provision the resources in response to authorization to provision the resources.

14. The article of manufacture of claim 10, wherein the operations are operable to:
if the estimated resources are immediately available, allocate the estimated resources immediately;
if a portion of the estimated resources are immediately available, allocate the portion of the estimated resources immediately and allocating additional resources when the additional resources become available; and
if none of the estimated resources are immediately available, allocate the estimated resources when the resources become available.

15. The article of manufacture of claim 10, wherein the operations are operable to:
if some of the estimated resources are available, wait until all of the estimated resources become available to allocate the estimated resources.

16. The article of manufacture of claim 10, further comprising:
integrating the quantifying, the estimating, and the provisioning with a workflow expressed in a workflow description language that models a business process.

17. The article of manufacture of claim 10, wherein the operations are operable to quantify the impact by:
using at least one of analytics and forecasting models.

18. The article of manufacture of claim 10, wherein the operations are operable to estimate the resources by:
using at least one of configuration estimation tools, mathematical modeling tools, and forecasting models to perform the estimation.

19. A system for automating allocation of resources, comprising:
a processor; and
hardware logic causing operations to be performed, the operations comprising:
in response to receiving an indication that network traffic to an online site will change,
quantifying an impact of the changed network traffic using historical data;
in response to the quantifying, estimating the resources that are needed to address the impact using the historical data;

in response to the estimating, provisioning without manual intervention the resources that have been estimated to handle the changed network traffic to the online site when the resources fall within pre-determined guidelines; and processing the changed network traffic to the online site using the provisioned resources.

20. The system of claim 19, wherein provisioning the resources is based on at least one business rule.

21. The system of claim 19, wherein the operations further comprise:

determining whether approval to provision the estimated resources is required; and in response to determining that approval is required, requesting approval.

22. The system of claim 19, wherein the operations further comprise:

provisioning the resources in response to authorization to provision the resources.

23. The system of claim 19, wherein the operations for provisioning further comprise:

if the estimated resources are immediately available, allocating the estimated resources immediately;

if a portion of the estimated resources are immediately available, allocating the portion of the estimated resources immediately and allocating additional resources when the additional resources become available; and if none of the estimated resources are immediately available, allocating the estimated resources when the resources become available.

24. The system of claim 19, wherein the operations for provisioning further comprise:

if some of the estimated resources are available, waiting until all of the estimated resources become available to allocate the estimated resources.

25. The system of claim 19, further comprising:

integrating the quantifying, the estimating, and the provisioning with a workflow expressed in a workflow description language that models a business process.

26. The system of claim 19, wherein the operations for quantifying the impact further comprise:

using at least one of analytics and forecasting models.

27. The system of claim 19, wherein the operations for estimating the resources further comprise:

using at least one of configuration estimation tools, mathematical modeling tools, and forecasting models to perform the estimation.

* * * * *